US012285846B1

United States Patent
Omdahl

(10) Patent No.: US 12,285,846 B1
(45) Date of Patent: Apr. 29, 2025

(54) MACHINE VISE STOP DEVICE

(71) Applicant: Ritchie Lee Omdahl, Corcoran, MN (US)

(72) Inventor: Ritchie Lee Omdahl, Corcoran, MN (US)

(*) Notice: Subject to any disclaimer, the term of this patent is extended or adjusted under 35 U.S.C. 154(b) by 370 days.

(21) Appl. No.: 18/078,313

(22) Filed: Dec. 9, 2022

Related U.S. Application Data

(60) Provisional application No. 63/287,636, filed on Dec. 9, 2021.

(51) Int. Cl.
| | | |
|---|---|---|
| B23Q 16/00 | (2006.01) | |
| B25B 1/02 | (2006.01) | |
| B25B 1/04 | (2006.01) | |
| B25B 1/10 | (2006.01) | |
| B25B 1/12 | (2006.01) | |
| B25B 1/24 | (2006.01) | |

(52) U.S. Cl.
CPC .......... B25B 1/2484 (2013.01); B23Q 16/001 (2013.01); B25B 1/02 (2013.01); B25B 1/04 (2013.01); B25B 1/103 (2013.01); B25B 1/125 (2013.01); B25B 1/2436 (2013.01); B25B 1/2468 (2013.01)

(58) Field of Classification Search
CPC  B25B 1/2484; B25B 1/02; B25B 1/04; B25B 1/103; B25B 1/125; B25B 1/2436; B25B 1/2468; B23Q 16/001
USPC .................................. 269/97, 315; 409/218
See application file for complete search history.

(56) References Cited

U.S. PATENT DOCUMENTS

| | | | | |
|---|---|---|---|---|
| 3,827,686 A | * | 8/1974 | Storkh | B25B 1/2468 248/286.1 |
| 4,030,718 A | * | 6/1977 | Philipoff | B23Q 16/001 269/315 |
| D269,518 S | * | 6/1983 | Karlan | D15/140 |
| 5,197,721 A | * | 3/1993 | Ruberg | B23Q 16/001 269/315 |
| 5,895,184 A | | 4/1999 | Walters et al. | |
| 5,996,986 A | * | 12/1999 | Ewing | B25B 1/2468 269/282 |

(Continued)

FOREIGN PATENT DOCUMENTS

DE  102021123121 A1 *  3/2023 .......... B23Q 16/001
DE  202024105516 U1 * 12/2024

*Primary Examiner* — Mahdi H Nejad
(74) *Attorney, Agent, or Firm* — JOHNSON AND PHUNG; Thomas Phung

(57) ABSTRACT

A stop device having a L shaped mounting bracket secured to a machine vise by a mounting bracket screw, a stop arm having an elongated slot extended within the stop arm and running in a parallel direction to a length of the stop arm, a pivot clamp and pivot clamp screw connected to the elongated slot and attaching the stop arm to the mounting bracket along a length side of a machine vise, the stop arm moveable in both an Y and Z direction and lockable by the pivot clamp, a fixed jaw located at the second end of the stop arm and a stop clamp attached to the second end of the stop arm by stop clamp screw, the stop clamp including an adjustable jaw facing the fixed jaw of the stop arm with the stop clamp screw enabling changes to a distance between the jaws to allow the jaws to hold and support a portion of a stop rod having varying shapes and sizes in a fixed, deform-free condition therebetween.

14 Claims, 4 Drawing Sheets

(56) References Cited

U.S. PATENT DOCUMENTS

| | | | |
|---|---|---|---|
| 6,641,125 B2* | 11/2003 | Bentley | B25B 1/103 269/282 |
| 2009/0273132 A1* | 11/2009 | Parks | B25B 1/2468 269/280 |
| 2018/0104787 A1 | 4/2018 | Richardson | |

* cited by examiner

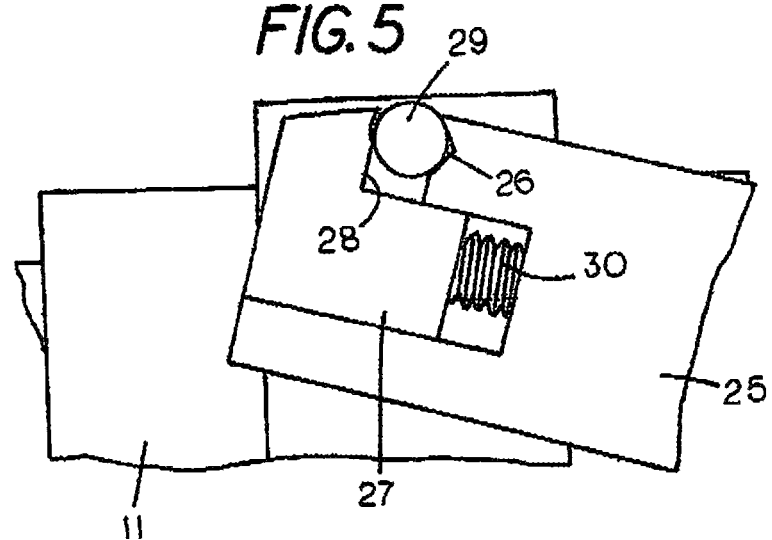
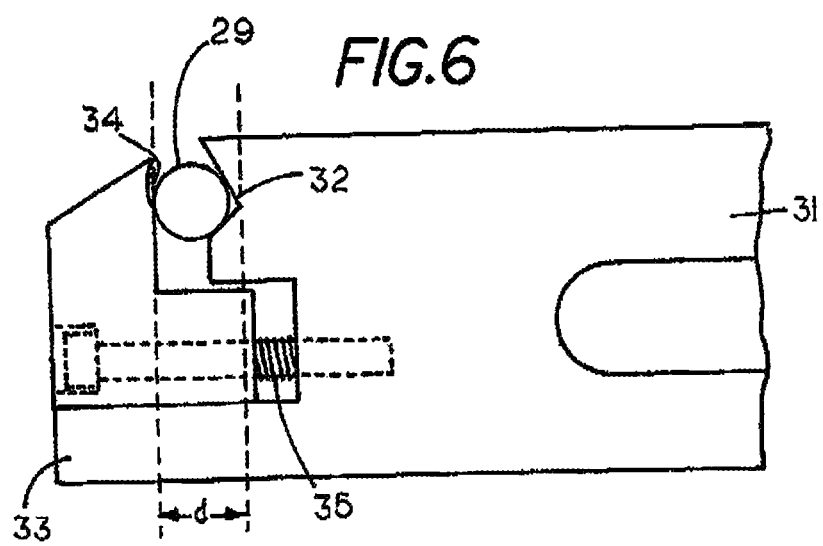

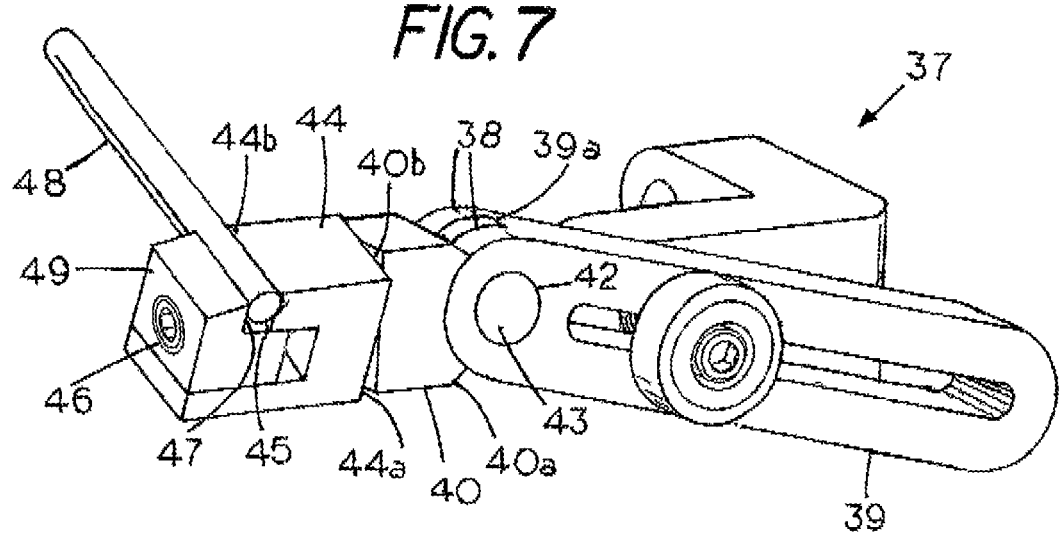
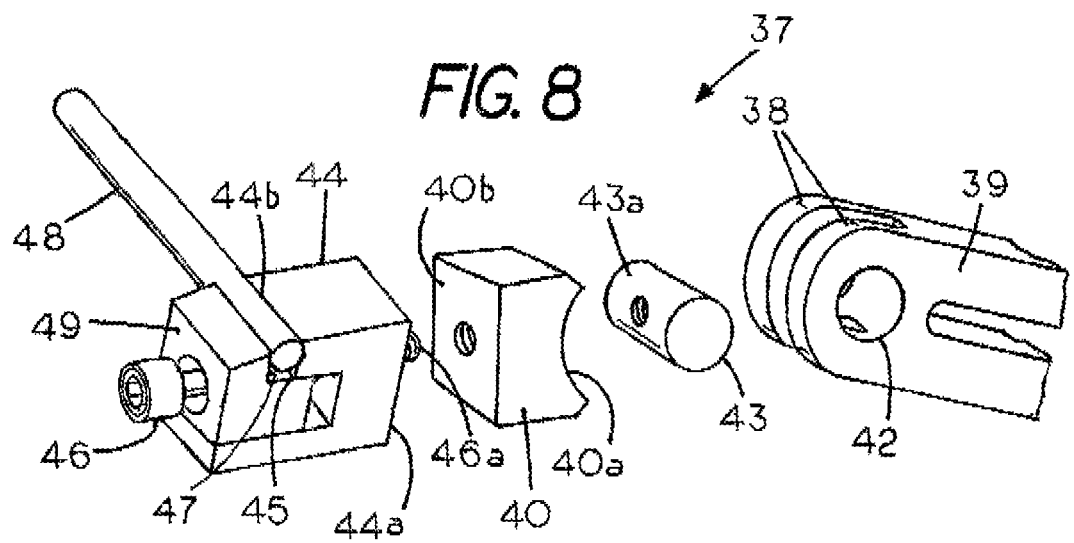

MACHINE VISE STOP DEVICE

CROSS REFERENCE TO RELATED APPLICATIONS

This application claims priority provisional patent application Ser. No. 63/287,636; filed on Dec. 9, 2021; titled MACHINE VISE STOP DEVICE.

FIELD OF THE INVENTION

This invention relates generally to machine vise and, more specifically to an improved work stop device for the positioning of work material held by a machine vise.

STATEMENT REGARDING FEDERALLY SPONSORED RESEARCH OR DEVELOPMENT

None

REFERENCE TO A MICROFICHE APPENDIX

None

BACKGROUND OF THE INVENTION

Work stop devices for the positioning of work material held by a machine vise have been limitedly developed in the industry as the work stop devices have been an afterthought that never got the proper attention that it properly deserves.

Some of the most common issues related to work stop devices for machine vise are clearance, adjustability, the prevention of deformation of material, which is effectively damaging the unit being worked on with every adjustment, and the failing of the associated fasteners.

For example, in situations in which the user needs to remove material from the top of a part, typically there was a piece of the current existing work stop that was sticking up too far and come into contact with the cutting device.

Another common issue relates to working on very small or thin parts and fitment wherein a stop rod of the work stop device was too large and the vise jaws were too close together for it to fit. In addition, the vast majority of machine vise work stops rely on the elastic deformation of material to function. This means that users are constantly deforming and damaging the tool that is supposed to be a precision locating device, and always having to overcome the material strength to tighten the fasteners.

There thus is a need for an improved machine vise work stop that solves the above problems of the currently existing machine vise work stops.

SUMMARY OF THE INVENTION

Briefly, the present invention comprises a stop device for the positioning a work material held by a machine that includes an L-shaped mounting bracket secured to a machine vise by a mounting bracket screw, an elongated stop arm having a first end, a second end and an elongated slot extended within the stop arm with the elongated slot running in a parallel direction to a length of the stop arm. A pivot clamp and pivot clamp screw are connected to the elongated slot and functions to attach the elongated stop arm to the L-shaped mounting bracket along a length side of the machine vise with the elongated stop arm slidaby moveable in both an Y and Z direction while also being lockable to a specific position by the pivot clamp.

The stop device also includes fixed jaw located at the second end of the stop arm in a fixed condition and a stop clamp attached to the second end of the stop arm by a dual-purpose stop clamp screw. The stop clamp includes an adjustable jaw facing the fixed jaw of the stop arm with the dual-purpose stop clamp screw enabling changes to a distance between the jaws through the displacement of the entire stop clamp with respect to the fixed jaw to allow the jaws to hold and support a portion of a stop rod having varying shapes and sizes in a fixed, deform-free condition therebetween while also allowing a top-loading of the stop rod to the jaws and a top removal of the stop rod from the jaws.

The present invention also comprises a stop device for the positioning a work material held by a machine vise that includes an L-shaped mounting bracket secured to a machine vise by a mounting bracket screw, an elongated stop arm having a first end, a second end and an elongated slot extended within the stop arm with the elongated slot running in a parallel direction to a length of the stop arm, a pivot clamp and pivot clamp screw connected to the elongated slot with the pivot clamp attaching the elongated stop arm to the L-shaped mounting bracket along a length side of the machine vise, the elongated stop arm slidaby moveable in both an Y and Z direction while also being lockable to a specific position by the pivot clamp.

Located proximal the second end of the stop arm is a rotating head rotating having a first side, a second side and a fixed jaw located on the second side of the rotating head and a stop clamp attached to the second end of the rotating head by a dual-purpose stop clamp screw. The stop clamp includes an adjustable jaw facing the fixed jaw of the rotating head with the dual-purpose stop clamp screw enabling changes to a distance between the jaws through the displacement of the entire stop clamp with respect to the fixed jaw to allow the jaws to hold and support a portion of a stop rod having varying shapes and sizes in a fixed, deform-free condition therebetween while also allowing a top-loading of the stop rod to the jaws and a top removal of the stop rod from the jaws.

BRIEF DESCRIPTION OF THE DRAWINGS

FIG. 5 is a close-up sideview showing a stop arm positioned at a slight angle with respect to the machine vise;

FIG. 6 is a close-up sideview showing a stop arm positioned in a parallel condition with respect to the machine vise;

FIG. 7 is a perspective view showing an alternative embodiment of a stop device for the positioning a work material held by a machine vise of the present invention; and FIG. 8 is a sideview showing the swivel head of the stop device of FIG. 7.

DESCRIPTION OF THE PREFERRED EMBODIMENT

Figure 1:
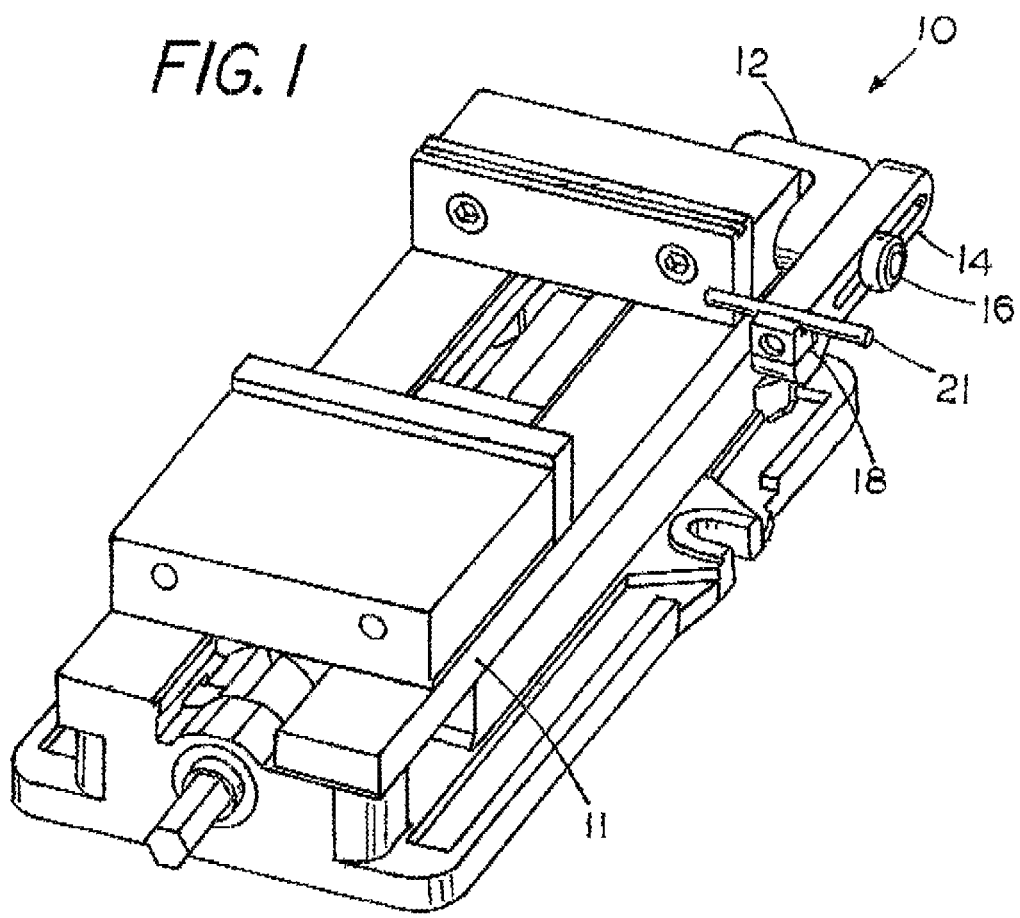
FIG. 1 is a perspective view showing an embodiment of a stop device of the present invention for the positioning a work material held by a machine vise.

The general purpose of the present invention, which will be described subsequently in greater detail, is to provide an improved work stop device for the positioning of work material held by a machine vise.

There has thus been outlined the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the disclosing subject matter be regarded as including such equivalent constructions insofar as they do not depart from the spirit and scope of the present invention.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Furthermore, there is no intention to be bound by any expressed or implied theory presented in the preceding technical field, background, brief summary or the following detailed description.

In addition, the accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of any potential claims.

Figure 2:
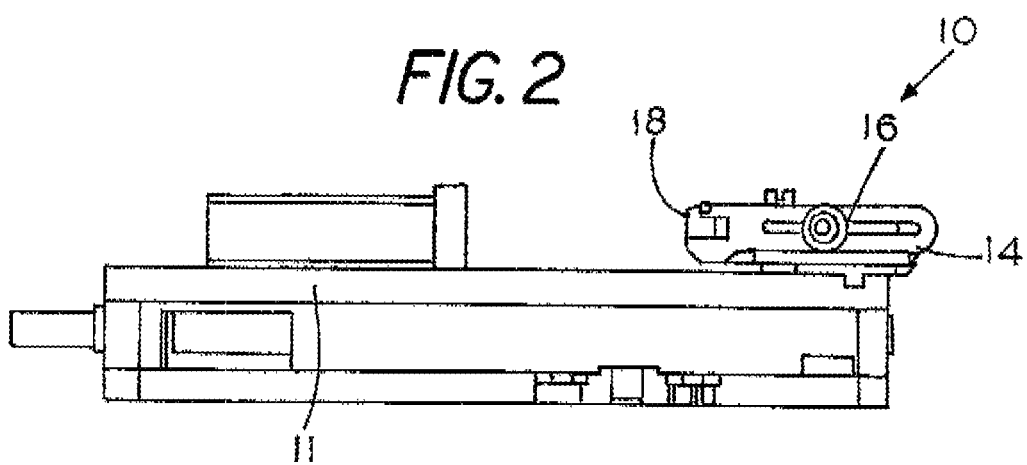
FIG. 2 is a side view of the stop device of FIG. 1.
Figure 3:
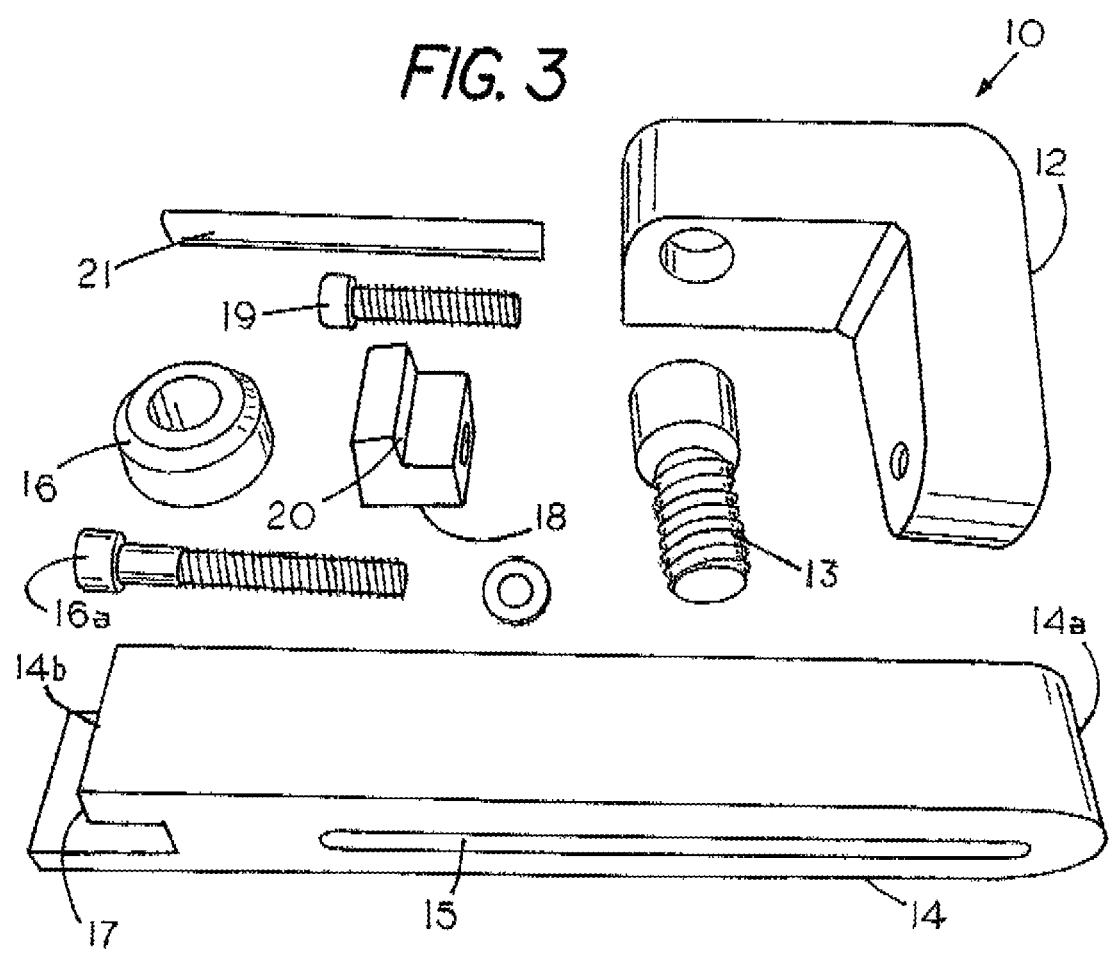
FIG. 3 is a perspective view showing the main parts of the stop device of FIG. 1.

Referring to FIGS. 1, 2, and 3, FIG. 1 is a perspective view and FIG. 2 is a side view showing an embodiment of a stop device 10 of the present invention for the positioning a work material held by a machine vise 11. FIG. 3 is a perspective view showing the main parts of stop device 10.

As shown in FIGS. 1-3, stop device 10 generally includes an L-shaped mounting bracket 12 secured to the machine vise 11 by a mounting bracket screw 13 and an elongated stop arm 14 having a first end 14a, a second end 14b and an elongated slot 15 extended within the stop arm 14 with the elongated slot 15 running in a parallel direction to a length of the stop arm 14.

A pivot clamp 16 with assistance from a pivot clamp screw 16a is shown connected to the elongated slot 15 with the pivot clamp 16 attaching the elongated stop arm 14 to the L-shaped mounting bracket 12 along a length side of the machine vise 11. A feature of the present invention is that the elongated stop arm 15 is slidaby moveable in both an X direction and Y direction while also being lockable to a specific position by the pivot clamp 16 through the singular adjustment of the pivot clamp 16 and pivot clamp screw 16a.

Stop device 10 also includes a fixed jaw 17 located at the second end 14b of the stop arm 14 in a fixed condition and a stop clamp 18 attached to the second end 14b of the stop arm 14 by a dual-purpose stop clamp screw 19.

The stop clamp 18 includes an adjustable jaw 20 facing the fixed jaw 17 of the stop arm 14 with the dual-purpose stop clamp screw 19 enabling changes to a distance "d" (shown in FIG. 6) between the jaws 17 and 20 through the displacement of the entire stop clamp 18 with respect to the fixed jaw 17 to allow the jaws 17, 20 to hold and support a portion of a stop rod 21 having varying shapes and sizes in a fixed, deform-free condition therebetween. For example, the jaws 17, 20 of the present invention are able to support stop rods having a cross-section comprising but not limited to a circular, triangle, hexagon, rectangular and square shaped.

Another feature of the present invention is that the adjustability in the distance "d" between the jaws 17 and 20 also allows for a top-loading of the stop rod 21 to the jaws 17, 20 and for a top removal of the stop rod 21 from the jaws 17, 20. More specifically, the adjustability of the jaws 17, 20 by dual-purpose stop clamp screw 19 enables the stop rod 21 to be lifted "upwards" from the jaws 17, 20. As such, there is no need to slide the stop rod 21 out lengthwise for the removal the stop rod 21 from the jaws 17, 20 thereby reducing deform or damage to the stop rod 21.

Figure 4:
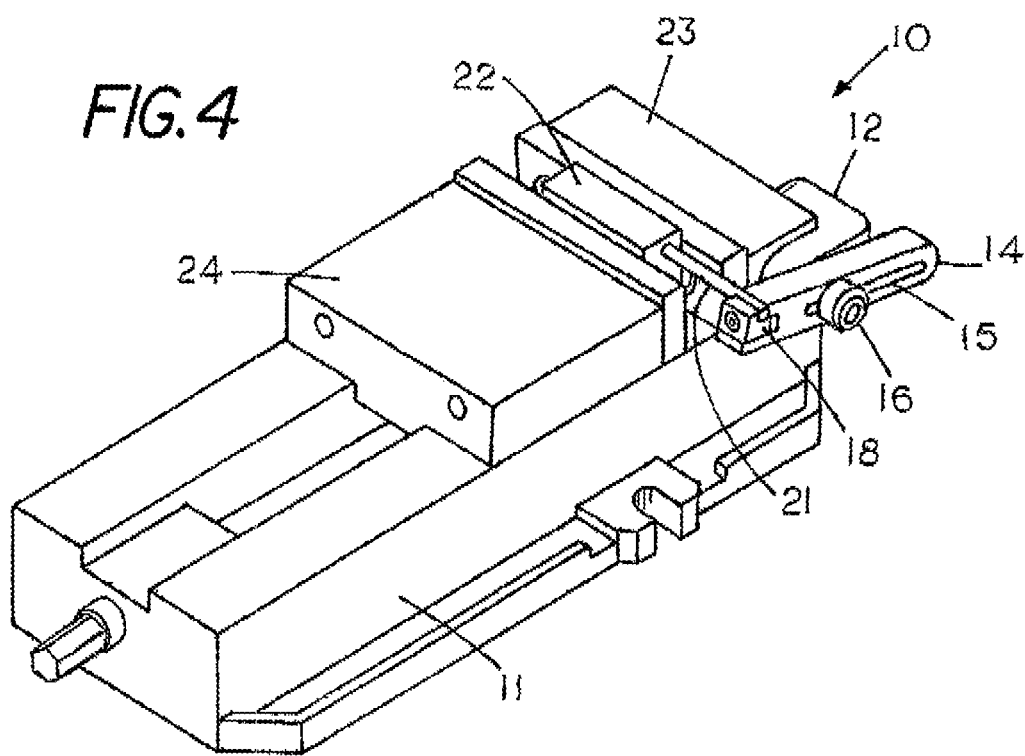
FIG. 4 is a perspective view showing the stop device of FIG. 1 positioning a work piece held by a fix jaw and a main clamping jaw of the machine vise.

FIG. 4 is a perspective view showing stop device 10 positioning a work piece 22 held a by fix jaw 23 and a main clamping jaw 24 of machine vise 11.

FIG. 5 is a close-up sideview showing a stop arm 25 positioned at a slight angle with respect to the vise machine 11. The stop arm 25 includes an inward slanting fixed jaw 26 and a stop clamp 27 having a flat adjustable jaw 28 with jaws 26 and 28 supporting a cylindrical-shaped stop rod 29. The distance between the jaws 26 and 28 is adjustable through the use of dual-purpose stop clamp screw 30, which enables the displacement of the entire stop clamp 27 with respect to the inward slanting fixed jaw 26 to allow the jaws 26 and 28 to hold and support a portion of cylindrical-shaped stop rod 29 therebetween while also allowing for a top-loading of the cylindrical-shaped stop rod 29 to the jaws 26 and 28 and for a top removal of the cylindrical-shaped stop rod 29 from the jaws 26 and 28.

FIG. 6 is a close-up sideview showing a stop arm 31 positioned in a parallel condition with respect to the vise machine 11. The stop arm 31 includes an inward slanting fixed jaw 32 and a stop clamp 33 having a curve shaped adjustable jaw 34 with jaws 32 and 34 supporting stop rod 29 therebetween.

FIG. 6 also shows a stop clamp 33 attached to the stop arm 31 by a dual-purpose stop clamp screw 35, which also functions to enable changes to the distance "d" between the jaws 32 and 34 through the displacement of the entire stop clamp 33 with respect to the fixed jaw 32 by the user's clock-wise and counter clock-wise rotation of dual-purpose stop clamp screw 35 to allow the jaws 32 and 34 to hold and support a portion of stop rod 29 in a fixed, deform-free condition therebetween.

The adjustability in the distance "d" between the jaws 32 and 34 also allows for a top-loading of the stop rod 29 to the jaws 32 and 34 and for a top removal of the stop rod 29 from the jaws 32 and 34. Lifting the stop rod 29 upward from the jaws 32 and 34 thereby eliminating the traditional need to slide the stop rod 29 out lengthwise from the jaws 32 and 34 for the removal the stop rod 29 from the jaws the jaws 32 and 34.

It is noted that in alternative embodiments of the present invention the jaws 32 and 34 may each comprises various shape surfaces including but not limited to a flat, zigzag, curved, or slanted surface. In addition, the fixed jaw may comprise a shape similar to a shape of the adjustable jaw or alternative comprise a different shape compared to the shape of the adjustable jaw.

FIG. 6 also shows stop arm 31 including a guide slot 36 for receiving a portion of a protrusion 33a extending from the stop clamp 33 with a portion of the dual-purpose stop clamp screw 35 extending through the protrusion 33a of the stop clamp 33, through the guide slot 36 and into the elongated stop arm 31. In the embodiment of FIG. 6 the protrusion 33a is shown extending from the stop clamp 33 perpendicular to the adjustable jaw 34. Although the dual-purpose stop clamp screw 35 may, in alternative embodiments of the present invention, extend into the stop arm 31 in various directions with respect to the length of the stop arm 31, FIG. 6 shows the dual-purpose clamp screw 35 extending into the stop arm 31 in a direction parallel to the length of the stop arm 31.

FIG. 7 is a perspective view showing an alternative embodiment of a stop device 37 for the positioning a work material held by a machine vise of the present invention. As shown, stop device 37 comprises similar general components to the stop device 10 of FIGS. 1-4. However, stop device 37 further includes a pair of mounting plates 38 extending from a second end 39a of an elongated stop arm 39 of stop device 37, a conical shaped a swivel pin 43 having an exterior surface 43a and a swivel head 40 having a first concave-shaped side 40a conforming to the shape of the exterior surface 43a of conical shaped a swivel pin 43 and a second side 40b.

FIG. 8 is a blow-apart perspective view showing of the stop device 37 of FIG. 7. The concave-shaped side 40a of the swivel head 40 is shown engageable to the exterior surface 43a of swivel pin 43 which is supported and secured between a pair of corresponding orifices 42 located on the pair of mounting plates 38.

Stop device 37 also includes a rotating head 44 having a first side 44a, a second side 44b and a fixed jaw 45 located on the second side 44b of the rotating head 44. The rotating head 44 is shown connected to the second side 40b of the swivel head 40. A stop clamp 49 is attached to the second end 44b of the rotating head 44 by a dual-purpose stop clamp screw 46 with the stop clamp 49 including an adjustable jaw 47 facing the fixed jaw 45 of the rotating head 44. As shown in FIG. 8, in the assembly of stop device 37, a free end 46a of the dual-purpose stop clamp screw 46 extends through stop clamp 49, rotating head 44, swivel head 40 and partially into a portion of swivel pin 43 in a perpendicular condition with respect to a length of swivel pin 43.

The attachment of the swivel head 40 to the swivel pin 43 by the dual-purpose stop clamp screw 46 provides the swivel head 40 with swivel or pivotal movement with respect to the elongated stop arm 39. The attachment of the rotating head 44 to the second side 40d of the swivel head 40 by the dual-purpose stop clamp screw 46 provides up to a three hundred sixty degrees rotation of the rotating head with respect to the swivel head 40. That is, the dual-purpose stop clamp screw 46 serves as the axis of rotation for the rotating head 44 while also as the locking or securing mechanism for the movement of the stop clamp 49, rotating head 44, and swivel head 40 since a free end of dual-purpose stop clamp screw 46 is threaded into a portion of swivel pin 43.

Similar to the stop device 10, the dual-purpose stop clamp screw 46 of stop device 37 enables changes to a distance between the jaws 45 and 47 through the displacement of the entire stop clamp 49 with respect to the fixed jaw 45 by the user's clock-wise and counter clock-wise rotation of dual-purpose stop clamp screw 46 to allow the jaws 45 and 47 to hold and support a portion of a stop rod 48 in a fixed, deform-free condition therebetween while also allowing a top-loading of the stop rod 48 to the jaws 45 and 47 and a top removal of the stop rod 48 from the jaws 45 and 47.

I claim:

1. A stop device for positioning a work material held by a machine vise comprising:
   an L-shaped mounting bracket secured to a machine vise by a mounting bracket screw;
   an elongated stop arm having a first end, a second end and an elongated slot extended within the stop arm with the elongated slot running in a parallel direction to a length of the stop arm, the second end of the stop arm including a guide slot for receiving a portion of a protrusion extending from the stop clamp with a portion of the dual-purpose stop clamp screw extending through the protrusion of the stop clamp, through the guide slot and into the elongated stop arm;
   a pivot clamp and pivot clamp screw connected to the elongated slot, the pivot clamp attaching the elongated stop arm to the L-shaped mounting bracket along a length side of the machine vise, the elongated stop arm slidaby moveable in both an X and Y direction while also being lockable to a specific position by the pivot clamp;
   a fixed jaw located at the second end of the stop arm in a fixed condition; and
   a stop clamp attached to the second end of the stop arm by a dual-purpose stop clamp screw, the stop clamp including an adjustable jaw facing the fixed jaw of the stop arm, the dual-purpose stop clamp screw enabling changes to a distance between the jaws through the displacement of the entire of the stop clamp with respect to the fixed jaw to allow the jaws to hold and support a portion of a stop rod having varying shapes and sizes in a fixed, deform-free condition therebetween while also allowing a top-loading of the stop rod to the jaws and a top removal of the stop rod from the jaws.

2. The stop device of claim 1 wherein the fixed jaw is flat, curved or slanted.

3. The stop device of claim 1 wherein the adjustable jaw is flat, curved or slanted.

4. The stop device of claim 1 wherein the fixed jaw comprises a different shape than the adjustable jaw.

5. The stop device of claim 1 wherein a cross-section of the stop rod comprises a triangle, a hexagon, or square shaped.

6. The stop device of claim 1 wherein the second end of the stop arm includes a guide slot for receiving a portion of a protrusion extending from the stop clamp perpendicular to the adjustable jaw with a portion of the dual-purpose stop clamp screw extending through the protrusion of the stop clamp, through the guide slot and into the elongated stop arm.

7. A stop device for positioning a work material held by a machine vise comprising:

an L-shaped mounting bracket secured to a machine vise by a mounting bracket screw;

an elongated stop arm having a first end, a second end and an elongated slot extended within the stop arm with the elongated slot running in a parallel direction to a length of the stop arm;

a pivot clamp and pivot clamp screw connected to the elongated slot, the pivot clamp attaching the elongated stop arm to the L-shaped mounting bracket along a length side of the machine vise, the elongated stop arm slidaby moveable in both an X and Y direction while also being lockable to a specific position by the pivot clamp;

a fixed jaw located at the second end of the stop arm in a fixed condition; and a stop clamp attached to the second end of the stop arm by a dual-purpose stop clamp screw, the stop clamp including an adjustable jaw facing the fixed jaw of the stop arm, the dual-purpose stop clamp screw enabling changes to a distance between the jaws through the displacement of the entire of the stop clamp with respect to the fixed jaw to allow the jaws to hold and support a portion of a stop rod having varying shapes and sizes in a fixed, deform-free condition therebetween while also allowing a top-loading of the stop rod to the jaws and a top removal of the stop rod from the jaws, the dual-purpose stop clamp screw extending into the second end of the stop arm in a direction parallel to the length of the stop arm.

8. A stop device for positioning a work material held by a machine vise comprising:

an L-shaped mounting bracket secured to a machine vise by a mounting bracket screw;

an elongated stop arm having a first end, a second end and an elongated slot extended within the stop arm with the elongated slot running in a parallel direction to a length of the stop arm;

a pivot clamp and pivot clamp screw connected to the elongated slot, the pivot clamp attaching the elongated stop arm to the L-shaped mounting bracket along a length side of the machine vise, the elongated stop arm slidably moveable in both an X and Y direction and lockable to a specific position by the pivot clamp;

a fixed jaw located at the second end of the stop arm in a fixed condition; and a stop clamp attached to the second end of the stop arm by a dual-purpose stop clamp screw, the stop clamp including an adjustable jaw facing the fixed jaw of the stop arm, the dual-purpose stop clamp screw extends into the second end of the stop arm in a direction parallel to the length of the stop arm, the dual-purpose stop clamp screw also enabling changes to a distance between the jaws through the displacement of the entire stop clamp with respect to the fixed jaw to allow the jaws to hold and support a portion of a stop rod having varying shapes and sizes in a fixed, deform-free condition therebetween while also allowing a top-loading of the stop rod to the jaws and a top removal of the stop rod from the jaws.

9. The stop device of claim 8 wherein the fixed jaw is flat, curved or slanted.

10. The stop device of claim 9 wherein the adjustable jaw is flat, curved or slanted.

11. The stop device of claim 10 wherein the second end of the stop arm includes a guide slot for receiving a portion of a protrusion extending from the stop clamp with a portion of the dual-purpose stop clamp screw extending through the protrusion of the stop clamp, through the guide slot and into the elongated stop arm.

12. The stop device of claim 11 wherein the second end of the stop arm includes a guide slot for receiving a portion of a protrusion extending from the stop clamp perpendicular to the adjustable jaw with a portion of the dual-purpose stop clamp screw extending through the protrusion of the stop clamp, through the guide slot and into the elongated stop arm.

13. The stop device of claim 12 wherein the fixed jaw comprises a different shape than the adjustable jaw.

14. The stop device of claim 13 wherein a cross-section of the stop rod comprises a triangle, a hexagon, or square shaped.

* * * * *